R. W. Drew.
Turning Lathe.
Nº 60,155.   Patented Dec. 4, 1866.
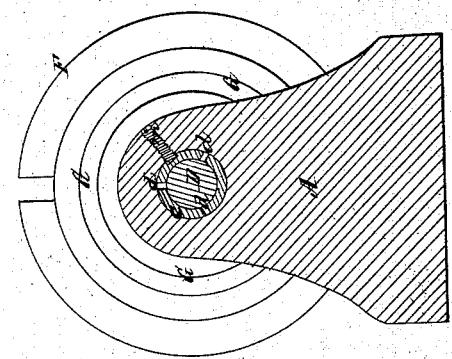
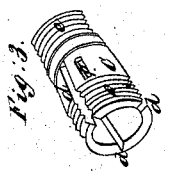
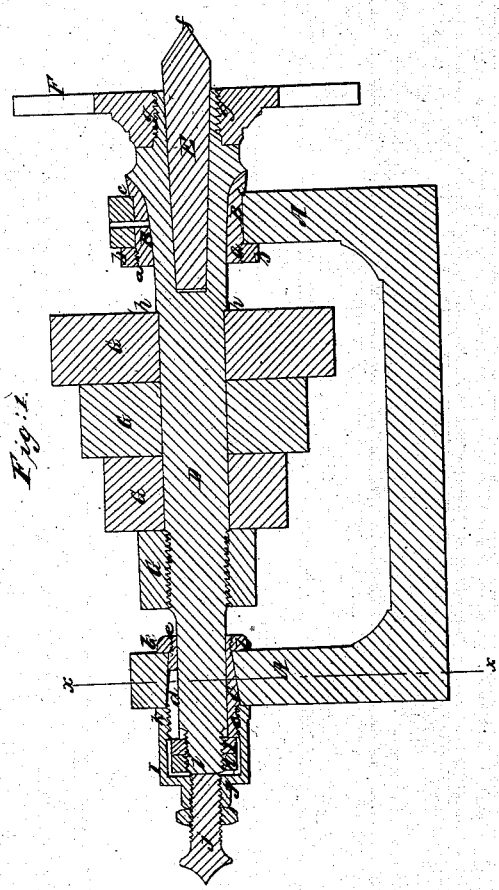
Witnesses:
Inventor:
Reuben W. Drew

United States Patent Office.

IMPROVEMENT IN TURNING-LATHES.

REUBEN W. DREW, OF LOWELL, MASSACHUSETTS.

Letters Patent No. 60,155, dated December 4, 1866.

SPECIFICATION.

TO ALL WHOM IT MAY CONCERN:

Be it known that I, REUBEN W. DREW, of Lowell, in the county of Middlesex, and State of Massachusetts, have invented certain new and useful Improvements in Lathes, of which the following is a full, clear, and exact description, reference being had to the accompanying drawings, making part of this specification, in which—

Figure 1 is a longitudinal vertical section through the centre of the frame containing the spindle of a lathe having my improvements applied thereto.

Figure 2 is a section on the line $x\ x$ of fig. 1.

Figure 3 is a view of one of the boxes in which the spindle of the lathe runs.

The boxes for the reception of the spindle of hand or engine lathes have heretofore been formed in two pieces let into the framework, those portions of the spindle resting in the boxes being turned down to a smaller diameter than the main portion of the spindle, and being provided with square shoulders to keep it in place. The front or portion of the spindle next the work has also been tapered in its bearings; but where such a spindle is used the work constantly crowds it back, causing it to revolve loosely in its bearings, and to counteract this tendency it is necessary to support the opposite extremity of the spindle in a step by which the spindle may be pressed snugly into its bearing and be kept up to the work. Both of these methods are, however, objectionable, for the reason that when either the spindle or its bearing becomes worn, the line of the centre of the spindle is thrown out of the prolongation of the line of the centre of the work, and in order to bring the axis of the spindle and that of the work in the same horizontal line, it is necessary to remove and file down the boxes, which is a tedious operation. To obviate this inconvenience is the object of my invention, which consists in supporting the spindle in solid boxes, one or both of which are slitted and made tapering in the framework; that portion of the spindle resting in one or both of the boxes being made of a greater diameter than the main portion or body of the spindle, the box or boxes being held in their places in the framework and drawn up snugly around the spindle, as their surfaces become worn, by means of nuts and screws, in an easy and expeditious manner.

To enable others skilled in the art to understand and use my invention, I will proceed to describe the manner in which I have carried it out.

In the said drawings A is the framework which is bored out for the reception of the boxes, B C, in which revolves the spindle D. Each of these boxes is made in one piece; the portion of the exterior of the box B, which rests in the framework, being of uniform diameter throughout, and provided with a screw-thread, $a$, for the reception of a nut, $b$, to clamp the shoulder, $c$, against the side of the framework and securely hold the box therein. The surface of the interior of the box B is made tapering, as shown in fig. 1, for the reception of the spindle D, which is made of a corresponding taper at this point, and of a larger diameter than the body of the spindle. The box C is cut or split, as seen at $d$, and the portion of the exterior of the box which rests in the framework A, is made tapering; the box C being also provided with a screw-thread, $e$, at each extremity, for a purpose hereafter to be explained. The inner end of the spindle D is bored out to receive the conical-shaped plug E, which terminates in a point, $f$, between which and the "dead centre" of the lathe (not shown in the drawings) is placed the work while being turned or bored, a chuck-plate, F, being screwed to the spindle D, at $g$, by which the work is secured in place after being adjusted to the centres. The spindle D is provided with a shoulder or projection, $h$, against which bears the inner end of a series of pulleys, G, which are fastened to the spindle, and by means of which the power is applied to drive the spindle. The outer end of the spindle is provided with a screw-thread, $i$, upon which turn the check-nuts H I, for preventing the spindle from having any longitudinal play within its boxes when the lathe is in use. J is a cap or thimble, the rear end of which is bored out to receive a set-screw, $j$, while the interior of the front end is provided with a screw-thread, $k$, for the purpose of securing the cap to the rear end of the box C. $l$ is a nut for keeping the box C from moving longitudinally within the framework when properly adjusted therein, and these boxes are prevented from turning within the framework by means of screws, $m$, one of which is seen in fig. 2, the screw passing into a recess, P, fig. 3, formed in the side of the box C, to admit of its longitudinal movement, and allow it to be drawn through the framework when the nut $l$ is turned, in order to contract the diameter of the box, and cause it to fit snugly around the spindle, should the surfaces become worn away sufficiently to require it. In heavy "chucking," where it is desirable to take off a portion of the friction between the rounded surfaces of the spindle and its box B, (occasioned by the work pressing forcibly in this direction,) after the box C has been brought snugly around the spindle by turning the nut $l$, and the spindle is prevented from having any longitudinal play by tightening the check-nuts H I, the cap or thimble J may be screwed upon the outside of the box, and the set-screw $j$ forced against the end of the spindle D, by which means I am enabled to prevent much of the friction which would otherwise be occasioned from this cause. Should the nut $l$ close the box C too tightly around the spindle, the cap or thimble on the opposite side of the box may be used as a check-nut and be tightened so as to slightly loosen the grasp of the box on the spindle. By increasing instead of reducing the diameter of those portions of the spindle where they rest in their bearings, the work is held much more steadily while being operated upon.

What I claim as my invention, and desire to secure by Letters Patent, as an improvement in lathes, and in lathes only, is—

Making the front box or bearing B, tapering in the manner and for the purpose set forth.

I also claim the spindle D, with its check-nuts H I, in combination with the slitted box C.

I also claim the slitted box C, with its nut, $l$, in combination with the cap J, and its set-screw $j$, for the purpose described.

REUBEN W. DREW.

Witnesses:
P. E. TESCHEMACHER,
WM. J. CAMBRIDGE.